United States Patent [19]

Watanabe et al.

[11] Patent Number: 5,408,583

[45] Date of Patent: Apr. 18, 1995

[54] SOUND OUTPUTTING DEVICES USING DIGITAL DISPLACEMENT DATA FOR A PWM SOUND SIGNAL

[75] Inventors: Kazuyoshi Watanabe, Tokyo; Ryou Ishikawa, Saitama, both of Japan

[73] Assignee: Casio Computer Co., Ltd., Tokyo, Japan

[21] Appl. No.: 913,597

[22] Filed: Jul. 14, 1992

[30] Foreign Application Priority Data

Jul. 26, 1991 [JP] Japan .................. 3-187821
Sep. 13, 1991 [JP] Japan .................. 3-234475
Sep. 13, 1991 [JP] Japan .................. 3-234476

[51] Int. Cl.[6] .............................. G10L 9/00
[52] U.S. Cl. ............................. 395/2.73; 395/2.1
[58] Field of Search ................. 395/2.1, 2.67, 2.73, 395/2.75, 2.76, 2.77, 2.79; 381/51

[56] References Cited

U.S. PATENT DOCUMENTS 4,658,369  4/1987  Sugiura ..................... 395/2.67
4,905,003  2/1990  Helferich ................... 395/2.67

Primary Examiner—Allen R. MacDonald
Assistant Examiner—Michelle Doerrler
Attorney, Agent, or Firm—Frishauf, Holtz, Goodman & Woodward

[57] ABSTRACT

Sound information is binarized by delta modulation or adaptive delta modulation. The resulting data is subjected to pulse wide modulation and the resulting data is delivered to a reproducing device, which detects a leading edge of a received signal pulse to produce a self operation timing clock to thereby reproduce a sound. When the reproducing device detects the absence of edges for a predetermined interval after the edge detection, it turns off a power source for an analog circuit to suppress power consumption.

8 Claims, 3 Drawing Sheets

SOUND OUTPUTTING DEVICES USING DIGITAL DISPLACEMENT DATA FOR A PWM SOUND SIGNAL

BACKGROUND OF THE INVENTION

The present invention relates to sound outputting devices to demodulate sound information which have been subjected to delta modulation (DM) or adaptive delta modulation (ADM).

Electronic devices are known which store digitized sound messages and reproduce the stored messages when required.

Various systems which digitize sound information are known. The DM and the ADM which is a modified delta modulation have the advantage of requiring less than a quantity of data required in the digitization of sound information than other digitizing systems which convert a sampled analog sound value to a digital value each time such sampling is made. Thus, when sound information is stored in a small-sized electronic device or the like, these DM and ADM are used in many cases.

The DM system compares the current sampled sound data value with the last sampled value, converts the former sound data to digital data "1" or "0" depending on whether the former value data is larger or smaller than the latter data value, and holds a one-bit data value at each sampling.

The ADM system gives predetermined different weights to the digital value "1" and "0" obtained by the ADM or DM. That is, the added or subtracted value $\Delta M$ ($\geqq 1$) is incremented by one at each sampling each time "1" or "0" appears successively while when either "1" changes to "0" or "0" changes to "1", "1" is subtracted from the $\Delta M$ value to thereby obtain the current data.

For example, when the digital data value changes as follows:

1, 1, 1, 0, 0, 0, 1.

The added or subtracted value $\Delta M$ changes in the ADM as follows:

+1, +2, +3, −2, −3, −4, +3.

Therefore, the sampled amplitude value of the sound information is as follows:

1, 3, 6, 4, 1, −3, 0.

As just described above, ADM differs more or less from DM in the significance of the digital data value. Also in the ADM, the digital data for each sampling operation can be expressed in one bit.

In order to decode and reproduce the sound information which has been subjected to ADM, clock generating means synchronous with ADM sound information received from a source of sound information, analog reproducing means, sound outputting means, power supply means and reproducing means are required.

Permanent provision of these means on an electronic device such as an electronic notebook would make it difficult to miniaturize the device as well as increase at least the cost. When a sound outputting device provided with these means is provided optionally for the electronic notebook, control means and data buses are required for providing an interface function between the electronic notebook as the device proper and the sound outputting device in addition to the above respective means.

SUMMARY OF THE INVENTION

The present invention is made in view of the above. It is an object of the present invention to provide a sound outputting device which is required to have no clock generating means and control means for synchronizing purposes.

According to the present invention, there is provided a sound reproducing device comprising:

edge detecting means for detecting a leading edge of a pulse of a PWM signal which has been subjected to pulse wide modulation (PWM) and given as sound data;

signal generating means for generating a timing signal a predetermined time after the edge detection by the edge detecting means;

data determining means for determining the level of the PWM signal present when a timing signal is received from the signal generating means in accordance with the timing signal to obtain the corresponding binary data;

displacement quantity determining means for determining a digital displacement quantity on the basis of binary data obtained by the data determining means;

digital sound data generating means for generating digital sound data in accordance with the quantity of displacement determined by the displacement quantity determining means; and digital-to-analog converting means for outputting an analog sound on the basis of the digital sound data generated by the digital sound data generating means. According to the present invention, there is also provided a sound reproducing system comprising:

a data transmitting device including:

storing means for storing sound data which has been binarized by delta modulation or adaptive delta modulation; and converting means for causing the binary data to be subjected to pulse wide modulation and sending the resulting PWM signal; and a reproducing device including:

edge detecting means for receiving the resulting PWM signal and for detecting a leading edge of a pulse of the received PWM signal;

timing signal generating means for generating various timing clocks on the basis of detection of the edge by the edge detecting means; and sound outputting means the operation of which is controlled by a timing clock generated by the timing signal generating means.

DETAILED DESCRIPTION

Figure 1:
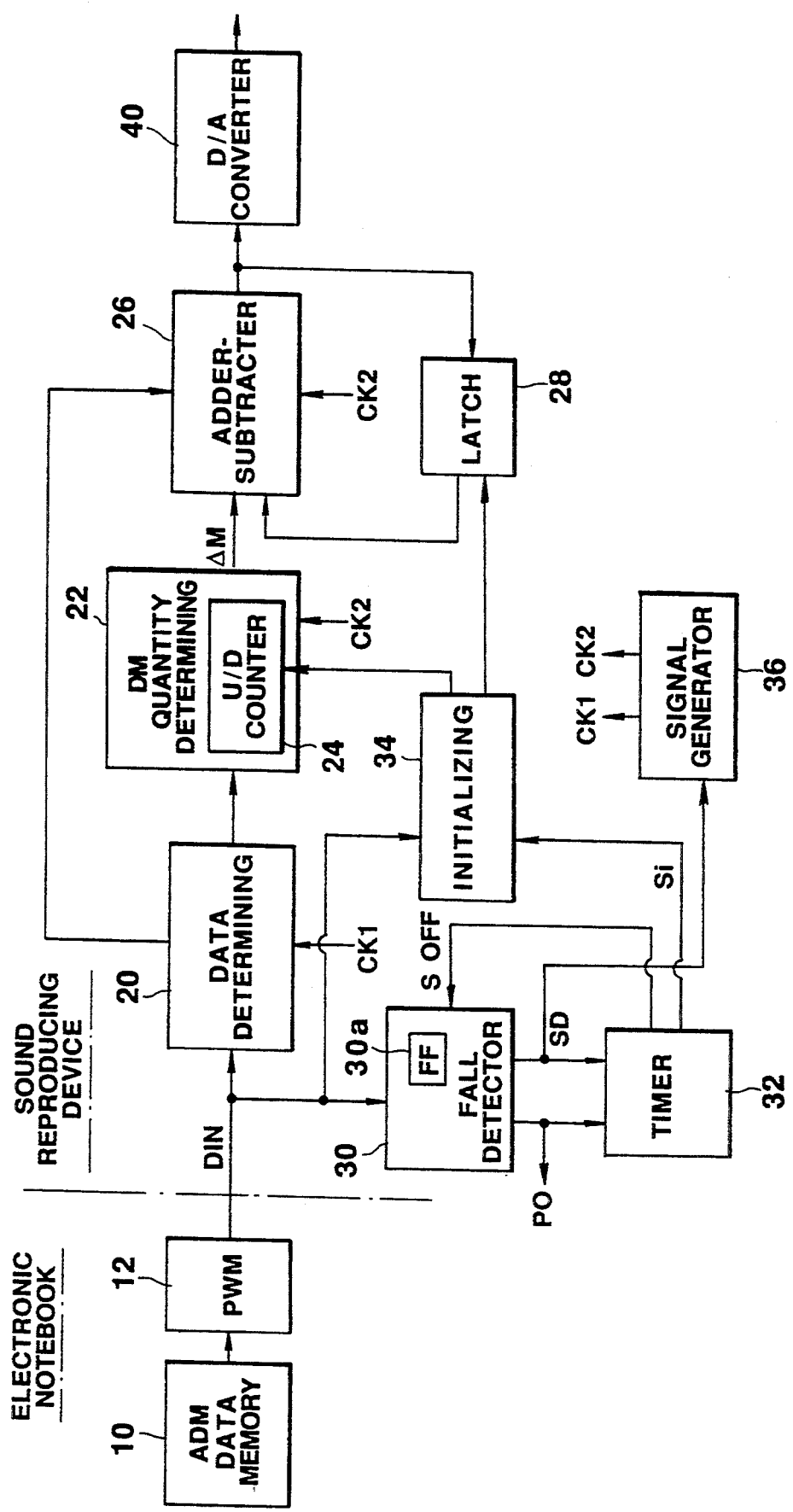
FIG. 1 is a block diagram of a sound reproducing device to which the present invention is applied.

Referring to FIG. 1, a source of sound information, for example an electronic notebook, has a data memory 10 which stores sound data as ADM data, which is converted by a pulse wide modulation (PWM) unit 12 to a value having a predetermined width varying depending on "0" or "1" and is delivered as a serial DIN signal to a data determining unit 20 and a fall detector 30 of the sound reproducing device.

Figure 2:
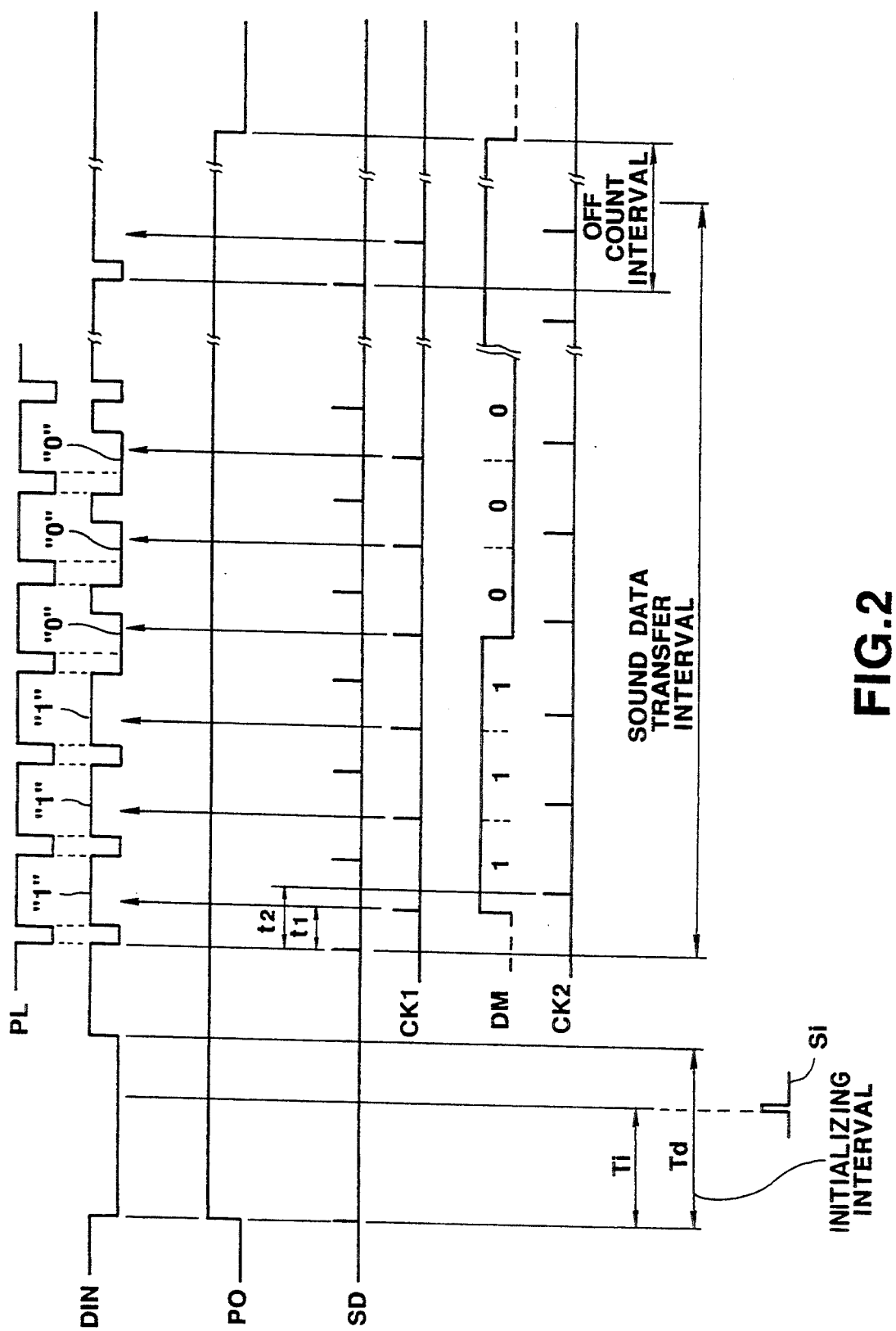
FIG. 2 is a timing chart illustrating the operation of the device.

More specifically, as illustrated in FIG. 2, the DIN signal is a pulse-width modulated signal which is generated based on the sound information, consisting of binary levels, i.e., "0" and "1", that are output in synchronism with a pulse signal PL of a predetermined period, and which takes "1" following a negative going pulse of the pulse signal PL, when the sound information is "1" and takes "0" following the negative going pulse of the pulse signal PL, when the sound information is "0".

Data determining unit 20 determines whether the respective bits of ADM data which has been subjected to PWM from a DIN signal received from an electronic notebook is "0" or "1" in accordance with an extraction signal CK1 generated on the basis of a fall edge in the DIN signal. The result of the determination at data determining unit 20 is delivered to a DM quantity determining unit 22.

DM quantity determining unit 22 is provided with an U/D counter 24 which counts up or down in accordance with the kind of bit data received, and the count of counter 24 determines a DM quantity (the differential value between the last data value and the current one). U/D counter 24 is incremented by one when the same kind of data "1" or "0" appears successively while when the data changes either from "1" to "0" or from "0" to "1", it is decremented by "1". DM quantity determining unit 22 delivers a DM quantity output to an adder-subtracter unit 26.

Adder-subtracter unit 26 adds and subtracts the DM output value from DM quantity determining unit 22 to and from the last output value from adder-subtracter 26 stored in latch 28. The output value from adder/subtracter 26 is again written into latch 28 and also is delivered to D/A converter 40 for sound reproduction.

In the present embodiment, the digital sound data is composed of 8 bits and latch 28 is also composed of 8 bits.

Fall detector 30 detects a fall edge in the received DIN signal. It is provided with a flip-flop (FF) 30a which is set by the detection of a first fall edge in the DIN signal. When FF 30a is set, fall detector 30 outputs a power source turning on signal PO which controls power supply to D/A converter 40 and other circuits of the sound reproducing device as well as enables timer 32. Fall detector 30 outputs a signal SD each time it detects a fall edge.

Timer 32 starts a timekeeping operation when it receives power source turning-on signal PO and continues the time keeping operation as long as the power source turning-on signal PO is received, and outputs signals Si and $S_{OFF}$ when it has detected a lapse of predetermined times Ti and $T_{OFF}$, respectively. Timer 32 is reset with a signal SD from fall detector 30.

Initializing unit 34 performs an initializing operation for sound reproduction. It receives a signal Si from timer 32 to set to "1" U/D counter 24 of DM quantity determining unit 22 and to set "128" in latch 28 with a rise edge in the DIM signal. The value "128" indicates an intermediate value of the 8-bit digital sound data.

Signal generator 36 is provided with a built-in one-shot multivibrator which outputs clock pulses CK1, CK2 with a time difference between these pulses each time it receives signal SD from fall detector 30. Data determining unit 20 determines the DIN signal in accordance with clock pulse CK1. DM quantity determining unit 22, and adder-subtracter 26 operate in accordance with clock pulse CK2.

INITIALIZATION

The initialization of the circuitry of the embodiment, thus constructed, will be described with reference to a timing chart of FIG. 2. When transfer of ADM data starts from the transmission end, the DIN signal continues to be low for a predetermined time interval before the transfer of the sound data. The low level time interval is set sufficiently long compared to the time duration of unit data corresponding to each bit in the data transfer.

Timer 32 is started with a first fall edge of the DIN signal. As long as the DIN signal continues to be low, the counter continues to count up and delivers an initializing timing signal Si to initializing unit 34 when a predetermined time Ti has passed. A timer operation time Ti after which the initializing timing signal Si from timer 32 is output is set shorter than the time $T_d$ for which low level state continues starting with a leading fall edge of the transferred data of the DIN signal and longer than the time duration of the unit data in the data transfer.

Initializing unit 34 receives this initializing timing signal Si to set to "1" U/D counter 24 of DM quantity determining unit 22. Initializing unit 34 confirms the receipt of initializing timing signal Si from timer 32, and delivers a set initial value "128" for latch 28 when the DIN signal changes from low to high to initialize latch 28.

Since the signal thereafter takes a low and a high level alternately at periods shorter than Ti during transfer of the sound data, the timer 32 counter is reset at each rise edge in the DIN signal and delivers no initializing timing signal to initializing units 34.

SOUND DATA PROCESSING

The sound data which have been subjected to ADM is subjected to pulse wide modulation (PWM); that is, "1" and "0" are converted to shorter and longer low levels which are input as a DIN signal to data determining unit 20.

Signal generator 36 generates a clock CK1 a time t1 after a fall edge in the DIN signal. Data determining unit 20 determines whether the DIN signal level is low or high at the timing of CK1 and delivers "1" or "0" as DM data to DM quantity determining unit 22.

Signal generator 36 generates a clock signal CK2 a time t2 after a fall in the DIN signal and delivers this clock signal CK2 to DM quantity determining unit 22 and adder-subtracter 26 for clocking purposes.

Assume in data determining unit 20 that the DM data extracted and produced from the DIN signal are, for example, "1, 1, 1, 0, 0, 0, 1, 0, 1, 1". Demodulation will be described below with reference to FIG. 3 in which (a), (b) and (c) show a count ΔM from DM quantity determining unit 22 for the DM data, the digital output from adder-subtracter 26, and an ADM level waveform which expresses in analog value the count ΔM, respectively.

When the DM data is delivered to DM quantity determining unit 22, the count of U/D counter 24 of DM quantity determining unit 22 changes. That is, when "1's" of the DM data appear successively, U/D counter 24 counts up "1" successively. When "0" appears, "1" is decremented from the count. When "0's" succeed, the count ΔM is incremented while when "1" appears, the count is decremented. When the U/D counter counts the DM data, the count ΔM changes as follows:

1, 2, 3, 2, 3, 4, 3, 2, 1, 2.

When adder-subtracter 26 receives the count ΔM from determining unit 22, it adds or subtracts the count ΔM to or from the last output count stored in latch 28. In this case, the latched initial value is set to 128. The addition or subtraction is performed such that when the DM data is "1", the current count ΔM in DM quantity determining unit 22 is added to the last output value stored in latch 28 while when the DM data is "0", the current value is conversely subtracted from the last stored value. Therefore, with the DM data, adder-subtracter unit 26 outputs the results of sequential addition/subtraction of the next value to/from the initial value "128" in latch 28 as follows:

+1, +3, +6, +4, +1, −3, 0, −2, +1.

Figure 3:
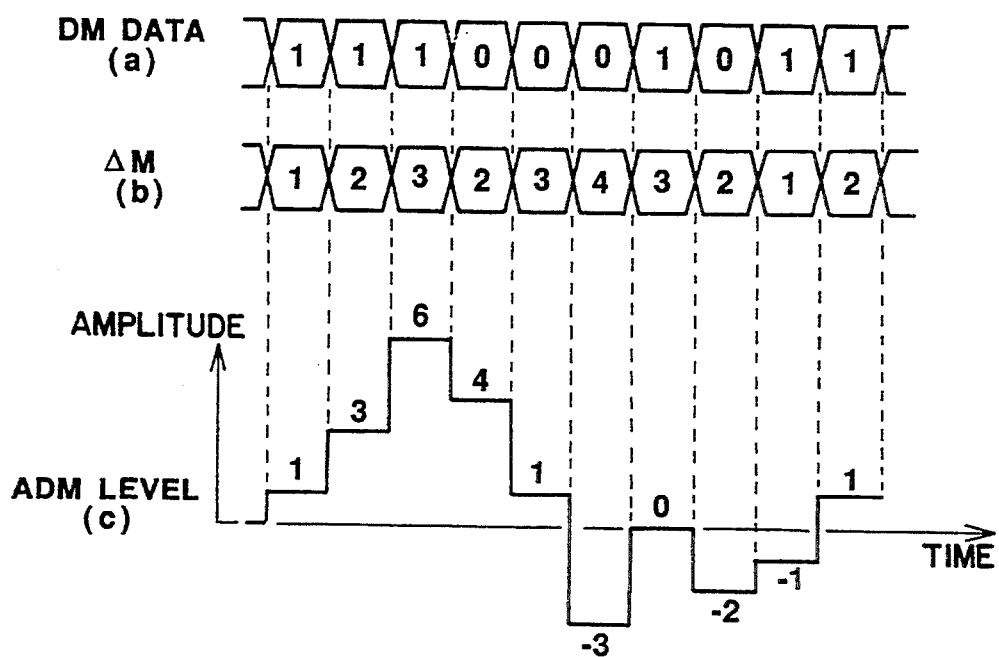
FIG. 3 illustrates ADM data reproduction.

FIG. 3 (c) shows an ADM level waveform expressing this output.

The ADM level waveform output is then delivered to D/A converter 8 to be converted to a corresponding analog waveform to thereby demodulate the original sound information.

When the transfer of the sound data is completed, the DIN signal is maintained high and does not fall. Therefore, since fall detector 30 generates no SD signal, the timer 32 continues to count up. When the count arrives at a predetermined value (OFF count value) at which time $T_{off}$ the timer 32 generates a power source turn-off signal $S_{off}$ and delivers it to fall detector 30 to thereby reset FF 30a, release the holding of the PO signal and turn off the power source for the reproducing unit.

In this way, a predetermined time after the transfer of the sound data is stopped, the power source for the circuits which consume relatively high power such as the analog circuits of the reproducing unit is turned off.

What is claimed is:

1. A sound reproducing device comprising:
   edge detecting means for detecting a leading edge of a pulse of a PWM signal which has been subjected to pulse width modulation (PWM) and given as sound data;
   signal generating means for generating a timing signal a predetermined time after detection of the leading edge by said edge detecting means;
   data determining means for determining the level of the PWM signal present when a timing signal is received from said signal generating means in accordance with the timing signal to obtain corresponding binary data;
   displacement quantity determining means for judging whether a first value of the binary data obtained by said data determining means is equivalent to a second value of previously obtained binary data, and for determining a digital displacement quantity by increasing a predetermined quantity when it is determined that the first and second values of the binary data are equivalent to each other, and by decreasing the predetermined quantity when it is determined that the first and second values of the binary data are not equivalent to each other;
   digital sound data generating means for generating digital sound data in accordance with said digital displacement quantity determined by said displacement quantity determining means; and
   digital-to-analog converting means for outputting an analog sound on the basis of the digital sound data generated by said digital sound data generating means.

2. A sound reproducing device according to claim 1, further comprising:
   time counting means for counting a predetermined time, outputting a time-out signal when the predetermined time is reached, the counting being reset by detection of the leading pulse edge by said edge detecting means; and
   means for stopping a power supply to at least said digital-to-analog converting means in accordance with the time-out signal from said time counting means.

3. A sound reproducing device according to claim 1, wherein:
   said displacement quantity determining means comprises:
   counting means, a value of which is incremented when the binary data obtained by said data determining means is the same as binary data previously obtained by said data determining means, and the value of which is decremented when the binary data obtained by said data determining means is different from the previously obtained binary data; and
   said digital sound data generating means comprises:
   digital sound data storing means for storing last generated digital sound data; and
   operating means for adding the value of said counting means to the last generated digital sound data stored in said storing means, when the binary data obtained by said data determining means is "1", and for subtracting the value of said counting means from the last generated digital sound data stored in said storing means, when the binary data is "0", whereby new digital sound data is generated.

4. A sound reproducing device according to claim 3, further comprising:
   initializing means for initializing said counting means and said digital sound data storing means; and
   means for detecting a particular signal sent before sound data of the PWM signal to operate said initializing means.

5. A sound reproducing system comprising:
   a data transmitting device including:
   storing means for storing sound data which has been binarized by delta modulation or adaptive delta modulation; and
   converting means for causing the stored binary data to be subjected to pulse width modulation and sending the resulting pulse-width modulated (PWM) signal; and
   a reproducing device including:
   edge detecting means for receiving the resulting PWM signal and for detecting a leading edge of a pulse of the received PWM signal;
   timing signal generating means for generating various timing clocks on the basis of detecting of the leading edge by said edge detecting means; and
   sound signal outputting means for outputting a sound signal under control of the timing clock generated by said timing signal generating means.

6. A sound reproducing system according to claim 5, wherein:
said data transmitting device further includes:
signal transmitting means for transmitting a predetermined signal before the PWM signal is transmitted; and
said reproducing device further includes:
means for initializing said reproducing device upon receipt of the predetermined signal transmitted by said signal transmitting means.

7. A sound reproducing system according to claim 6, wherein:
said timing signal generating means of said reproducing device includes means for generating a sampling clock a predetermined time after the detection of the leading pulse edge by said edge detecting means; and
said sound signal outputting means comprises:
data determining means for determining the level of a received PWM signal in accordance with the generated sampling clock to provide binary data;
operating means for obtaining digital sound data on the basis of the binary data obtained by said data determining means; and
digital-to-analog converting means for converting the digital sound data obtained by said operating means to analog sound data.

8. A sound reproducing system according to claim 7, wherein:
said reproducing device includes:
time counting means for outputting a time-out signal when said time counting means has counted a predetermined time, said time counting means being reset in accordance with the detection of the leading pulse edge by said edge detecting means; and
means for turning off power supply for at least said digital-to-analog converting means in accordance with the time-out signal for said time counting means.

* * * * *